July 8, 1952 G. AUE 2,602,683
ROTOR FOR TURBOMACHINES
Filed Oct. 3, 1945
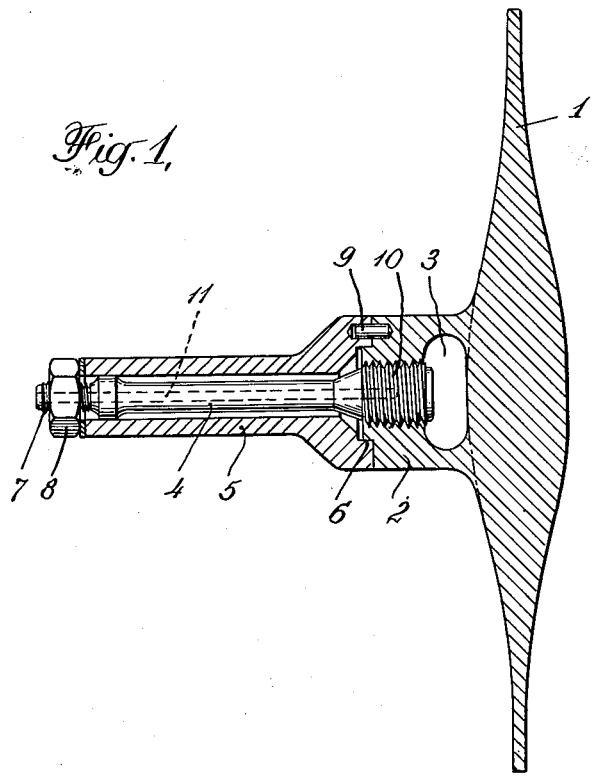
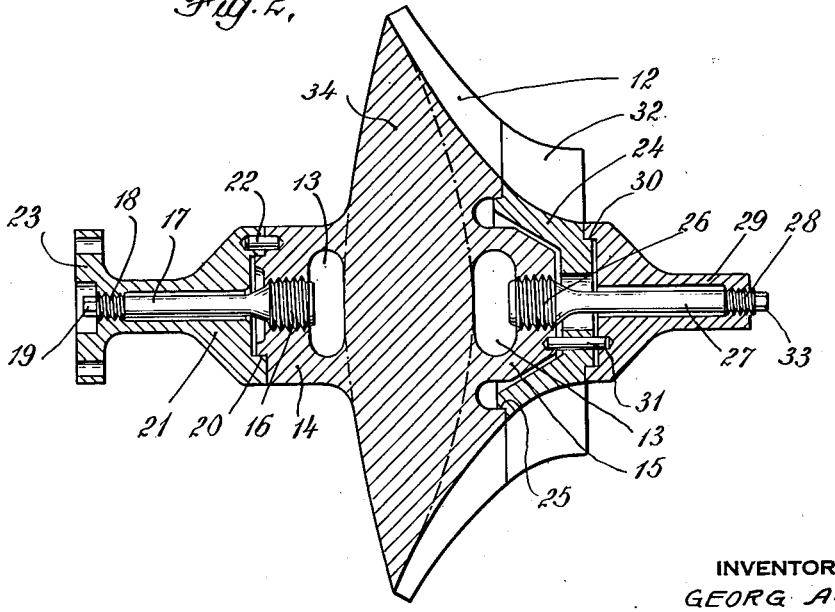
INVENTOR
GEORG AUE
BY
ATTORNEYS Patented July 8, 1952

2,602,683

UNITED STATES PATENT OFFICE 2,602,683

ROTOR FOR TURBOMACHINES

Georg Aue, Winterthur, Switzerland, assignor to Sulzer Freres, Societe Anonyme, Winterthur, Switzerland Application October 3, 1945, Serial No. 619,988
In Switzerland March 3, 1945

10 Claims. (Cl. 287—53)

The present invention relates to a rotor for turbo-machines and consists of at least one solid of revolution with at least one hub and a shaft end fixed to it. The invention consists in that the shaft end is bored through longitudinally and is drawn under preliminary stressing against the solid of revolution by a bolt fixed to the hub and led through the bore in the shaft end.

Preferably the hub is provided with a hollow co-axial space in such a way that it forms with the solid of revolution a body yielding in the radial direction. It is preferable to fix the axial bolt to the hub and to center the shaft end on a part of the hub lying opposite to the solid of revolutions where the influence of the radial expansion of the solid of revolution is a minimum. The axial bolt may be screwed into the hub of the rotor. In order to prevent the shaft end rising from the hub more at one side than at the other during service, it is preferable to make the cross section of the axial bolt smaller than the cross section of the shaft end and to give the axial bolt a preliminary stressing up to at least 50% of its yield point stress. In order that the preliminary stressing in the axial bolt and in the shaft end may be maintained continuously, the shaft of the axial bolt should be at least four times as long as its diameter. The preliminary stressing required in the axial bolt may be produced by means of a differential thread, the ratio of whose dimensions are chosen in such a way, that the squares of the diameters of the threads on the bolts are inversely proportional to the fatigue strengths of the material used for the nuts working on them. In a special form of execution at least one annular intermediate body may be clamped btween the shaft end and the solid of revolution, whereby it is possible to fix the axial bolt on the shaft and to center the shaft end on a spot of the intermediate member lying opposite to the solid of revolution, where the influence of the expansions occurring in the solid of revolution is a minimum. The solid of revolution may be formed as a disc of approximately uniform strength.

It is known to make rotors without any bore in one piece with the shaft end. The draw-back in such an arrangement is that the qualities of the material chosen must be a compromise between the qualities required for the rotor and those of the material required for the shaft end. Consequently, it has been recommended to make the rotor in several parts, in order to be able to have each separate part made of a material suitable for the work done. It is difficult however to connect these separate parts to each other and to centre them with respect to each other, in such a way that they act as a uniform whole when subjected to all the stresses occurring in service and to the differences in expansion to which they are thus subjected, particularly at very high speeds and/or at very high temperatures.

According to one known proposal, the rotor for high peripheral speeds is formed as an unbored disc of uniform strength and provided with hubs which are equipped with a slightly tapered axial bore, into which the flange-shaped thickened tapered ends of the rotor shaft are inserted and pressed into the bore in the hub under a preliminary stressing by means of bolts parallel to the axis. It is difficult, and requires particularly accurate working in the shops, to be able to maintain in continuous service with this known form of execution the preliminary stressing required for centering the shaft and rotor since the centrifugal forces do not stress the hub and the shaft end equally and therefore cause relative displacements between them. If, in addition, rotor and shaft consist of different materials with co-efficients of expansion greatly differing from each other, as for example steel and light-metal alloys, or if the service temperature of the rotor and of the continuation of the hub are higher than those of the shaft, the preliminary stressing and consequently the centering action between shaft and rotor will be annulled. As a result, the lack of balance may act unfavourably and endanger the connection between rotor and shaft.

By means of the present invention, the difficulties described above can be avoided in the manufacture and working of built-up rotors. The radial expansions of the rotor occurring in service do not influence the hub and the elements attached to it to any great extent, so that a connection with the amount of resistance to bending required to obtain service without trouble, and also good centering between the solid of revolution and the shaft, is continually ensured.

On the accompanying drawing, forms of execution of the subject matter of the invention are given by way of example, Fig. 1 showing a first example of execution and Fig. 2 a further example of execution, both in axial cross section.

In the example of execution shown in Fig. 1, the solid of revolution 1 is, for instance, the rotor disc of a compressor, of a gas or steam turbine, or the like, without axial bore and formed as a disc of approximately uniform strength and provided on one side with the hub 2. In order to be able to drive this solid of revolution 1 at high peripheral speeds of, for instance, 350 m./s. and more, it is made of a material capable of standing high stresses, for instance of an alloy of steel or aluminium. If the solid of revolution 1 is subject to high working temperatures, as is the case in gas and steam turbines, it is preferably made of an alloy steel resistant to heat.

The hub 2 is provided with a co-axial hollow space 3, so that the hub together with the solid of revolution 1 forms a body stiff in the axial direction but yielding radially. The axial bolt 4 is screwed into the hub 2. The bolt 4 is surrounded by a longitudinally-bored shaft end 5 which is fitted on to the hub 2 provided with a centering edge 6 and is connected to the hub by means of one or more securing pins 9, so that it cannot rotate relatively to the hub. The shaft end 5 is arranged in a bearing not shown in the drawing for instance a plain bearing with forced lubrication or a ball bearing. The part 7 of the axial bolt 4 projecting from the shaft end 5, is threaded to take the nut 8. By tightening this nut, the shaft end 5 is pressed on to the hub 2, so that the axial bolt 4 receives a corresponding preliminary stressing. This stressing may, under consideration of the theory of elasticity (Hooke's law), for instance be determined by the difference in length between the bolt 4 when free from stress and when subject to preliminary stressing, by means of a scale introduced for this purpose into the axial bore 11 of the bolt. In this manner it is possible to bring the preliminary stressing up to a pre-calculated required value.

The maximum external diameter of the shaft end 5 running in a bearing, is limited by the permissible bearing peripheral speed, so that it is important to utilise this restricted cross-section, which has to be divided between the shaft end 5 and the axial bolt 4 in such a way that a maximum of axial preliminary stressing is obtained which prevents the shaft end 5 from moving axially away from the hub in service, and thus ensures the greatest possible reliability in service. This is the case when the cross-section of the axial bolt 4 is smaller than the cross-section of the shaft end 5, whereby the axial bolt 4 is to be subjected to preliminary stressing up to at least 50% of its yield point by means of the nut 8. In order to eliminate any possibility of damage by permanent deformation of the axial bolt 4 and to avoid a gradual reduction of its preliminary stressing, this bolt is designed as an elastic bolt, whose shaft is to be at least 4 times as long as its diameter. The pressures on the surface of the threads engaging the hub 2 and the nut 8 are suited to the fatigue strength of their respective materials, in such a way that the squares of the diameter of the threaded part 7 and of the threaded end 10 are inversely proportional to the fatigue strengths of the materials used for making the nuts working on them.

In the embodiment shown in Fig. 2, the solid of revolution 34, suitable to withstand great centrifugal forces, is provided with blading 12. On the solid of revolution 34 the hubs 14 and 15 are arranged with a co-axial hollow space 13. The threaded end 16 of the axial bolt 17, which is designed as an elastic bolt, is screwed into the hub 14. The other end of the axial bolt 17 is provided with a threaded part 18, the thread of which has a lower pitch than that of the threaded head 16. The end of the bolt 17 beyond the threaded part 18 is not circular but square or hexagonal, etc., suitable for taking a spanner.

Screwed on to the thread 18 and set on to the fitting edge 20 of the hub 14, is the shaft end 21, which is bored through longitudinally and connected to the hub 14 by means of one or more driving pins 22, so that they cannot rotate relatively to each other. The shaft end 21 is provided with a flange 23 which may be connected to a driving or to a driven shaft not shown in the drawing. The pressing pressure preventing the shaft end 21 from rising from the hub 14 during service, is produced by the turning of the axial bolt 17 which produces, in consequence of the different pitches of the screw threads 16 and 18, a preliminary tensioning stress corresponding to this pressure.

The necessary sequence of steps to accomplish the assembly just described is:

First, screwing the axial bolt 17 into the hub 14 so that its inner end enters well into the hollow space 13; placing the driving pin or pins 22 in position in the hub 14; sliding the shaft end 21 over the protruding axial bolt 17 so that it appropriately engages the driving pins 22; and backing out the axial bolt 17 from its threaded engagement with the hub 14 whereby its outer threaded portion 18 engages the shaft end 21, it being observed that, the threaded portions 16 and 18 being of different pitch though of the same hand, the shaft end of 21 will thus be drawn firmly into engagement with the hub 14 and the axial bolt 17 will be appropriately prestressed.

At its right hand end, the solid of rotation 34 has a centering rib 25 into which the intermediate body 24, surrounding the hub 15 annularly and fitted with blades 32, is inserted. In order to obtain freedom from bending of the whole body, the centering between the shaft end 29 and the solid of rotation 34 is effected over the intermediate body 24 which has a greater diameter than the hub 15.

In order that undeviating centering between the solid of revolution 34 and the intermediate body 24 may be retained despite the radial expansion effects brought about in each by centrifugal force during service, the annular intermediate body is made of a thickness and is composed of a substance, and that, when rotated independently at speeds corresponding to those of the solid of rotation 34, the portion of it intended to engage the centering rib 25 would expand to the same or to a somewhat greater extent than the centering rib 25 itself. In addition, the elasticity of the intermediate body 24 must be sufficiently great so that during service the effect of the radial expansion of its left hand end is imperceptible at its right hand end because of its axial extension and, because of its wall thickness, its centering with respect to the shaft end 29, consequently, is not affected.

The hub 15 receives one threaded end 26 of the axial bolt 27; the shaft end 29 is screwed onto the thread 28 at the opposite end of bolt 27 and is centered on the fitting edge 30 of the intermediate body 24. The shaft end 29 is connected to the intermediate body 24 and to the hub 15 by means of one or more securing pins 31, so that it cannot rotate relatively to these parts. By turning the threaded bolt 27 by means of a spanner applied to a square or hexagonal end piece 33, in consequence of the difference in pitch between the threads 26 and 28, as explained in connection with the assembly of shaft end 21 to hub 13 by means of axial bolt 17, the shaft end 29 is drawn onto the intermediate body 24 and the latter onto the rotor body 34, whereby the bolt 27 receives a corresponding preliminary stressing, chosen so great that during service it is not possible for the intermediate body 24 to rise at one side or for the shaft end 29 to rise from its contact surfaces on the intermediate body 24.

The construction and dimensioning of the different parts of the bolt 29 are, because of technical reasons of strength, the same as those of the bolts 4 and 17. Both the shaft end 21 and the shaft end 29 may be carried in a bearing and adapted for transmitting power from and to the solid of revolution 34, without the axial bolts 17 and 27 being thereby subjected to additional stresses.

I claim:

1. A high speed rotor and separable shaft assembly including, in combination, a rotor disc formed upon a unitary, entirely unimpaired solid of revolution as a base element, a hub of smaller diameter integrally formed on and extending outwardly coaxially from said base element, a separable tubular shaft coaxial with and extending outwardly from said hub, means for positively preventing relative rotational movement between said shaft and said hub, a bolt under substantial longitudinal preliminary stress within said shaft coaxial therewith, stop means for holding the inner end of said bolt fixed against outward axial movement relative to said hub, and stop means for holding the outer end of said bolt fixed against inward axial movement relative to said shaft.

2. An assembly according to claim 1 in which the hub has a coaxial hollow space within it adjacent to the base element.

3. An assembly according to claim 1 in which means for centering the shaft on the disc are provided on the outward part of the hub away from the base element at which part the effect of the radial expansion of said base element due to centrifugal force during rotation is at a minimum.

4. An assembly according to claim 1 in which the stop means holding the inner end of the bolt are screw threads.

5. An assembly according to claim 4 in which the stop means holding the outer end of the bolt are screw threads of different pitch from the inner end threads, whereby the preliminary stress imparted to the bolt is provided by the differential in the thread pitches.

6. An assembly according to claim 1 in which the minimum cross-sectional area of the material forming the bolt is less than the minimum cross-sectional area of the material forming the shaft and the preliminary stress imparted to the bolt is at least fifty percent of its yield point stress.

7. An assembly according to claim 1 in which the length of the bolt between stop means is at least four times its diameter.

8. An assembly according to claim 1 in which an annular intermediate separate body is clamped between the shaft and the rotor disc coaxially around the bolt and the hub.

9. An assembly according to claim 8 in which centering means are provided on that part of the outer face of the intermediate body at which the transmitted effect of the radial expansion of the base element due to centrifugal force during rotation is at a minimum and engage the inner end of the shaft.

10. An assembly according to claim 1 in which the stop means holding the inner end of the bolt consists of a male threaded portion on the inner end of the bolt and a mating female threaded element engaging it and the stop means holding the outer end of the bolt consists of a male threaded portion on the outer end of the bolt and a mating female threaded element engaging it, the squares of the diameters of the two male portions being inversely proportional to the fatigue strength of the materials used for their respective mating female elements.

GEORG AUE.

REFERENCES CITED

The following references are of record in the file of this patent:

UNITED STATES PATENTS

| Number | Name | Date |
|---|---|---|
| 1,347,343 | Ljungstrom | July 20, 1920 |
| 1,347,344 | Ljungstrom | July 20, 1920 |
| 1,931,692 | Good | Oct. 24, 1933 |
| 1,953,297 | Good | Apr. 3, 1934 |
| 2,318,051 | Brace | May 4, 1943 |
| 2,364,599 | Burrus | Dec. 12, 1944 |

OTHER REFERENCES

Ser. No. 385,333, Schutte (A. P. C.), published May 25, 1943.